(12) United States Patent
Gautam et al.

(10) Patent No.: US 8,676,236 B1
(45) Date of Patent: Mar. 18, 2014

(54) SYSTEM, METHOD, AND COMPUTER PROGRAM FOR GENERATING A SHORT MESSAGE SERVICE (SMS) MESSAGE USING TEMPLATE CODES

(75) Inventors: Amit Gautam, Jagadhari (IN); Ajay Kumar Gautam, Ambala (IN)

(73) Assignee: Amdocs Software Systems Limited, Dublin (IE)

( * ) Notice: Subject to any disclaimer, the term of this patent is extended or adjusted under 35 U.S.C. 154(b) by 414 days.

(21) Appl. No.: 12/834,857

(22) Filed: Jul. 12, 2010

(51) Int. Cl.
*H04W 4/14* (2009.01)

(52) U.S. Cl.
USPC .............................................. 455/466; 705/5

(58) Field of Classification Search
USPC ..................... 705/5, 14.73; 455/466; 715/747
See application file for complete search history.

(56) References Cited

U.S. PATENT DOCUMENTS

| | | | |
|---|---|---|---|
| 2004/0019487 A1 | 1/2004 | Kleindienst et al. | 704/270.1 |
| 2006/0058048 A1 | 3/2006 | Kapoor et al. | 455/466 |
| 2008/0178095 A1* | 7/2008 | Lee | 715/747 |
| 2008/0278740 A1 | 11/2008 | Bird et al. | 358/1.15 |
| 2009/0070157 A1* | 3/2009 | Weitman | 705/5 |
| 2011/0214115 A1* | 9/2011 | Kuusilinna et al. | 717/171 |

FOREIGN PATENT DOCUMENTS

WO 2009/022356 2/2009 ............. H04W 4/20

\* cited by examiner

*Primary Examiner* — Phuoc H Doan
(74) *Attorney, Agent, or Firm* — Zilka-Kotab, PC

(57) ABSTRACT

A system, method, and computer program product are provided for generating a short message service (SMS) message using template codes. In use, a message to be sent as a short message service (SMS) message is received. Additionally, a template associated with the message is identified. Further, at least one code associated with the template is identified. Moreover, the SMS message is generated using the at least one code.

20 Claims, 6 Drawing Sheets

SYSTEM, METHOD, AND COMPUTER PROGRAM FOR GENERATING A SHORT MESSAGE SERVICE (SMS) MESSAGE USING TEMPLATE CODES

FIELD OF THE INVENTION

The present invention relates to short message service (SMS) messages, and more particularly to the generation of SMS messages.

BACKGROUND

Short message service (SMS) messages have conventionally been communicated over networks with an entirety of a message in its original form as configured by a sender of the SMS message. Thus, SMS messages have typically been devoid of any data compression or other techniques for consolidating the data therein. Unfortunately, such traditional communication methods have exhibited various limitations.

For example, delivery failure due to bulk messaging is a common scenario in the current mobile computing environment because of numerous subscribers simultaneously responding to an event [e.g. disaster (9/11), festivals etc.]. The SMS centers (SMSC) are unable to handle this huge traffic due to comparatively lower bandwidth available for wireless communication. There is thus a need for addressing these and/or other issues associated with the prior art.

SUMMARY

A system, method, and computer program product are provided for generating a short message service (SMS) message using template codes. In use, a message to be sent as a short message service (SMS) message is received. Additionally, a template associated with the message is identified. Further, at least one code associated with the template is identified. Moreover, the SMS message is generated using the at least one code.

DETAILED DESCRIPTION

Figure 1:
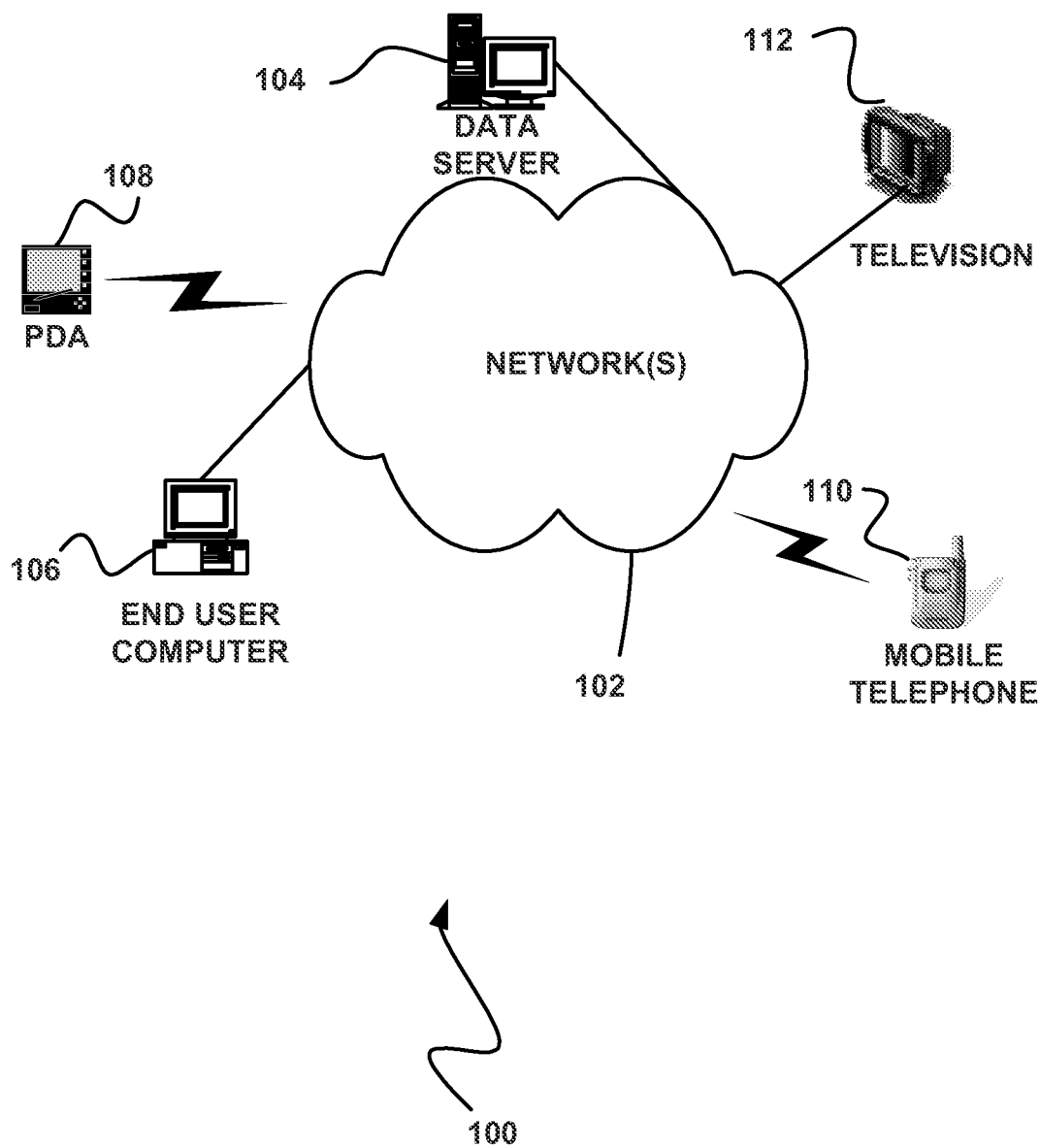
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
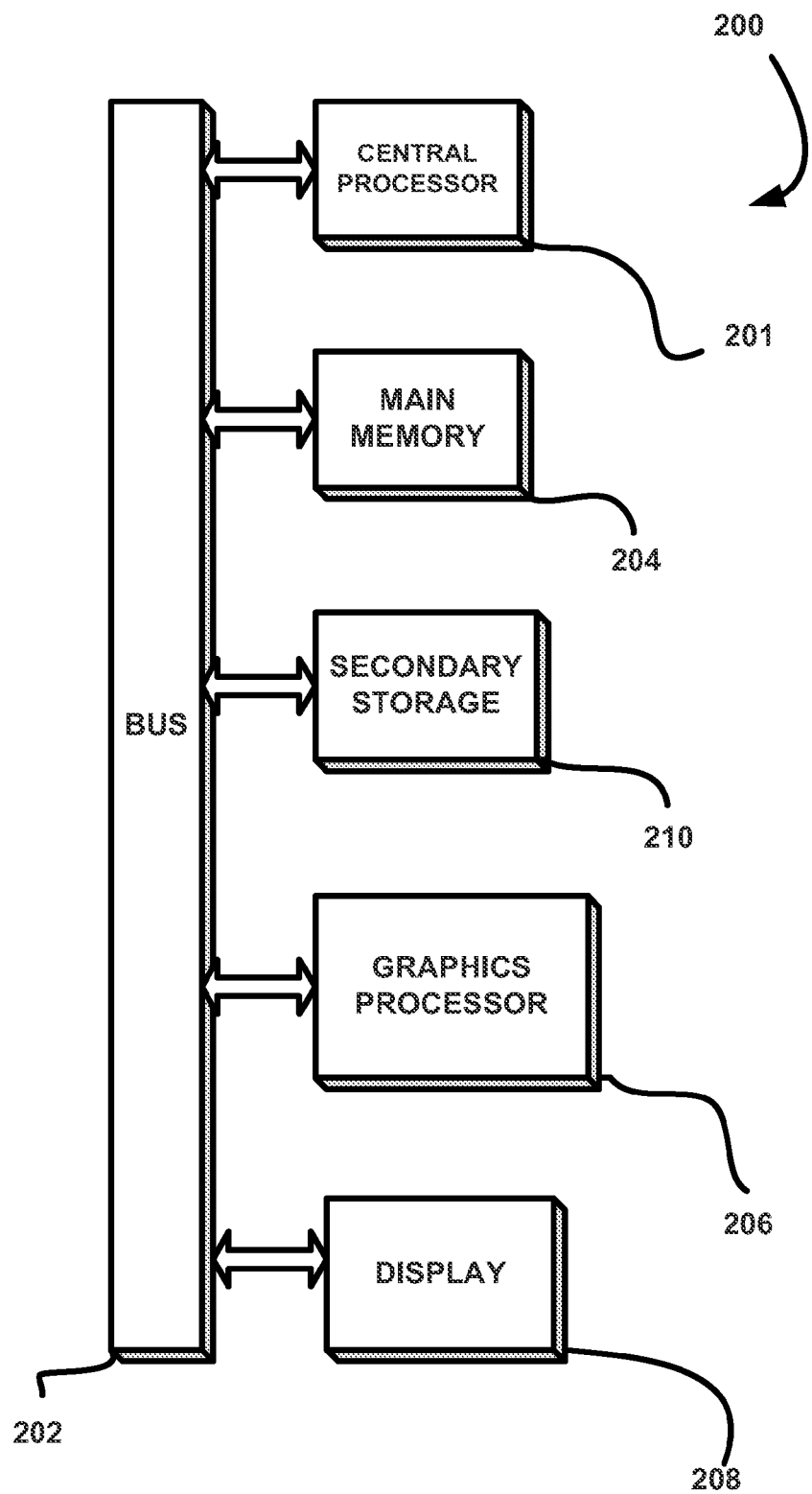
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
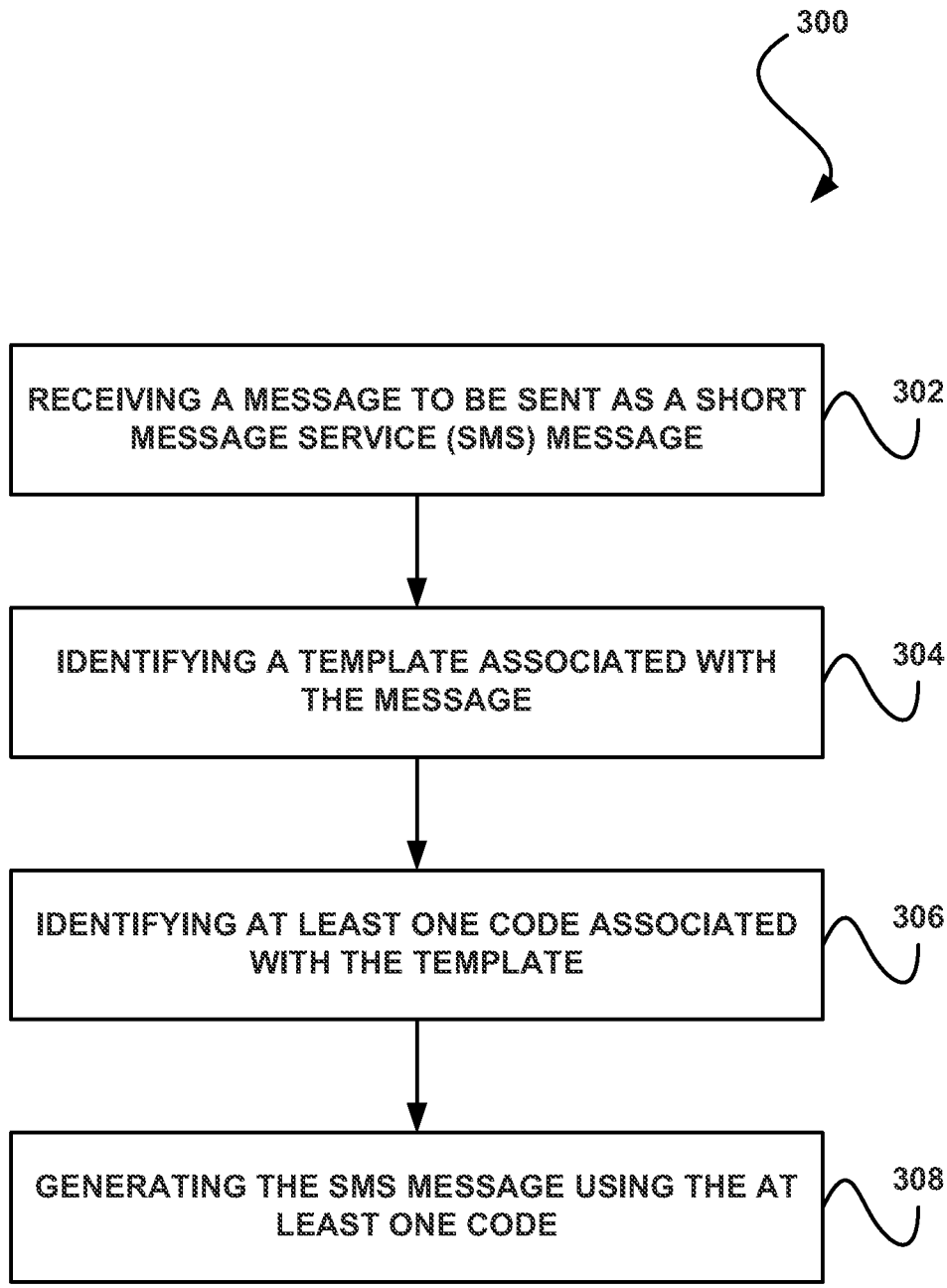
FIG. 3 illustrates a method for generating a short message service (SMS) message using template codes, in accordance with one embodiment.

FIG. 3 illustrates a method 300 for generating a short message service (SMS) message using template codes, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a message to be sent as a short message service (SMS) message is received. In the context of the present description, the SMS message includes any message configured (e.g. generated, etc.) for communication over SMS. For example, the SMS message may be a message configured utilizing a protocol of SMS.

Accordingly, the message may include any type of message to be sent (e.g. communicated, transmitted, etc.) as the SMS message (e.g. to be configured for being communicated over SMS). In one embodiment, the message may include text, an image, or any other data. For example, the message may optionally only include text, an image, etc. configured by a user for the purpose of being sent as the SMS message.

In another embodiment, the message may include an identifier of a template. It should be noted that with respect to the present description, the template may include any preconfigured data (e.g. text, image, etc.) associated with at least one code capable of being utilized to communicate a message between parties. Optionally, the template may include all data desired to be communicated via the SMS message. Thus, the message may optionally only include the identifier of the template. As another option, the template may include only a portion of data desired to be communicated via the SMS message, such that the message may include the identifier of the template and control strings for customizing the template.

Further, the message may be received utilizing a graphical user interface (GUI), such as a GUI of a device from which the SMS message is to be sent. For example, such device may include a mobile device (e.g. such as any of the mobile devices described above with respect to FIGS. 1 and/or 2), an SMS center (SMSC), etc. As noted above, the message may be received in the form of text.

As also noted above, the message may be received in the form of an identifier of a template and optionally control strings for customizing the template. In one embodiment, the template may be selected from a plurality of predefined templates by a user via the aforementioned GUI (e.g. where the templates are stored in the mobile device or other device via which the message is received). In this way, the identifier of the selected template may optionally be automatically included in the message in response to the selection of the template. Moreover, the controls strings may be entered (e.g. typed, etc.) by the user via such GUI. By allowing the user to select a template for indicating at least a portion of data to be sent via the SMS message, the user may optionally avoid manually entering the data represented by the selected template.

Additionally, as shown in operation 304, a template associated with the message is identified. As described above, the template may include any preconfigured data (e.g. text, image, etc.) associated with at least one code capable of being utilized to communicate a message between parties. As also noted above, an identifier of the template may be included in the message. Thus, in one embodiment, the template may be identified from the identifier of the template included in the message.

In another embodiment, the template may be identified from a default template. Just by way of example, in response to a determination that the message does not include an identifier of the template, a default template may be identified. As an option, the default template may include a dictionary of words and/or phrases in which each of the words and/or phrases is associated with a different index.

Further, at least one code associated with the template is identified, as shown in operation 306. In the context of the present description, the code may include data associated with the template that is representative of other data. For example, the code may be a shortened representation of the other data (e.g. smaller in size than the other data, etc.).

In one embodiment, the code associated with the template may include the identifier of the template. In another embodiment, the code may be included in the template. As an option, the code in the template may be an index associated with (e.g. representative of) a word or phrase included in the message. For example, a word and/or phrase included in the message may be matched to a word and/or phrase in the template, and an index associated with the matched word and/or phrase in the template may be identified. Of course, it should be noted that the code associated with the template may be identified in any manner.

Moreover, the SMS message is generated using the at least one code, as shown in operation 308. As noted above, the SMS message may be generated in a manner that allows communication of the SMS message. For example, the SMS message may be generated for communicating the received message over SMS.

In one embodiment, the SMS message may be generated using the code by inserting the code into the SMS message. Just by way of example, where the code includes the identifier of the template, the SMS message may be generated to include the identifier of the template. In this way, content of the template beyond the identifier of the template may optionally be avoided from being included in the SMS message since the identifier of the template included in the SMS message may allow identification of the template.

In another embodiment, the SMS message may be generated using the code by replacing at least a portion of the message with the code. For example, where the code is representative of data included in the received message, the code may replace such data in the SMS message. Thus, the data represented by the code may be avoided from being included in the SMS message since the code included in the SMS message may allow identification of the data.

In yet another embodiment, the SMS message may be further generated by setting a template flag in the SMS message. For example, the template flag may be set to indicate that the SMS message includes the code associated with the template. Such flag may allow a receiver of the SMS message to identify the code included therein and convert the code to the data represented by the code.

In still yet another embodiment, the SMS message may be further generated by inserting at least one data control string included in the message into the SMS message. As noted above, such data control string may customize a template identified by the SMS message (e.g. by a code representative of an identifier of the template that is included in the SMS message). Thus, the SMS message may be generated to include the code(s), template flag, and optionally data control strings to allow a device receiving the SMS message to create the data represented by the SMS message (e.g. for display to a user of such receiving device).

By generating the SMS message using at least one code associated with a template, data compression (or virtual data compression) of such SMS message may be provided. For example, the SMS message may be generated using the code(s) for reducing a size of the SMS message utilized for sending the received message. In one embodiment, a user may send a larger amount of data in the 160 character limit that may be imposed on the SMS message (e.g. by the SMSC, etc.) than were the code(s) not used to generate the SMS message.

In another embodiment, the SMS message may be generated using the code(s) associated with a template for allowing the user to send a 160 character message in a lesser number of bits than were the SMS message to not be generated using the code(s). For example, each code may be smaller in size than the characters it represents, such that the size of the SMS message may be reduced by generating it to include the code in place of the characters represented by the code.

By reducing the size of the SMS messages in this way, more messages may be enabled to be communicated over a network with a particular available bandwidth than would be enabled to be communicated were the size of the SMS messages not reduced. For example, the total number of bits traveling in the network via SMS may be reduced such that space for more messages communicated in the network may be created, thus, increasing the throughput of the network. As an option, a network service provider through which the SMS messages are communicated may charge its subscribers sending the SMS messages less in exchange for increased SMS message transmissions (e.g. resulting in profit) and a reduced cost per SMS message transmitted. Further, allowing more messages to be communicated in this manner may reduce a possibility of delivery failure of SMS messages resulting from insufficient network bandwidth.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
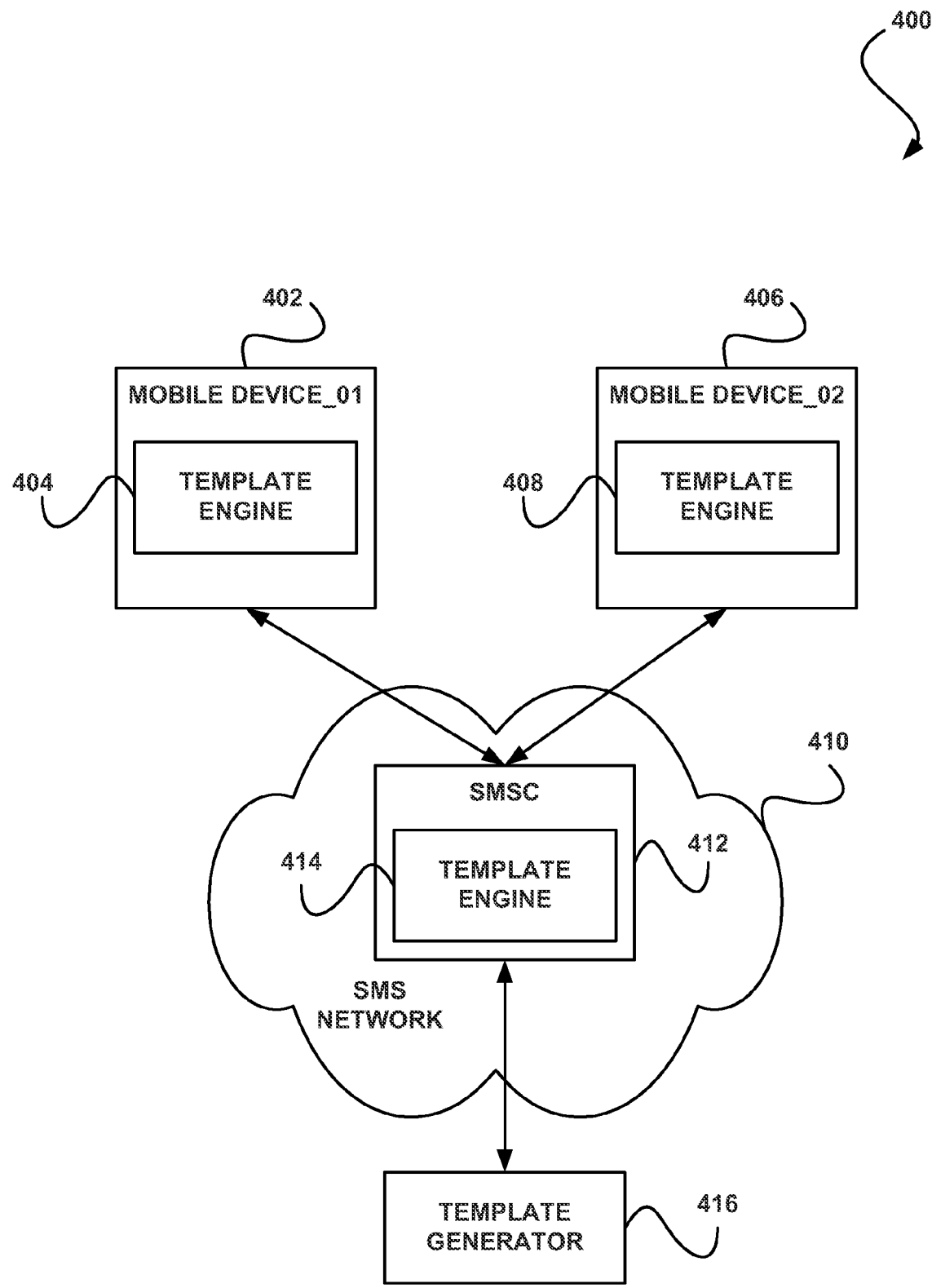
FIG. 4 illustrates a system for generating a short message service (SMS) message using template codes, in accordance with another embodiment.

FIG. 4 illustrates a system 400 for generating a short message service (SMS) message using template codes, in accordance with another embodiment. As an option, the system 400 may be implemented in the context of the details of FIGS. 1-3. Of course, however, the system 400 may be implemented in any desired environment. Again, the aforementioned definitions may equally apply to the description below.

As shown, a first mobile device 402 is in communication with a second mobile device 406 via an SMSC 412 located in an SMS network 410. The first mobile device 402 and the second mobile device 406 may optionally each include a mobile device of a user or any other subscriber of the SMS network 410. Further, with respect to the present embodiment, each of the first mobile device 402 and the second mobile device 406 may be capable of sending and receiving SMS messages that are generated utilizing template codes.

For example, as shown, the first mobile device 402 and the second mobile device 406 each include a template engine 404, 408 for generating SMS messages using template codes and translating the same to data represented by the SMS messages (e.g. for display thereof). The template engine 404, 408 may be a software component of each of the first mobile device 402 and the second mobile device 406. Further, the template engines 404, 408 may each store predefined templates that are associated with the codes capable of being utilized to generate the SMS messages, along with identifiers associated with such predefined templates. Of course, however, the predefined templates may be stored in any location that is accessible to the template engine 404 of the first mobile device 402 for allowing use thereof in generating SMS messages.

In one embodiment, the template engine 404 of the first mobile device 402 may receive a message from a user of the first mobile device 402. The message may include an identifier of a template. For example, the user may have selected the template from a plurality of predefined templates (e.g. stored by the template engine 404 of the first mobile device 402), and upon such selection the message may have been automatically generated to include an identifier of the selected template. As an option, a first component of the template engine 404 may receive the selection for generating the message including the identifier of the template, such that a second component of the template engine may receive the message including the identifier of the template.

Upon receipt of the message, the template engine 404 of the first mobile device 402 may then identify the template associated with the identifier of the template included in the message. For example, the template engine 404 may use such identifier to identify the template. The template engine 404 of the first mobile device 402 may determine whether the template requires any additional information from the user for allowing the template to be used to generate data for another user receiving the SMS message (e.g. such as data control strings for customizing the template, etc.).

If it is determined that additional information is not required, the template engine 404 of the first device 402 generates an SMS message using a code associated with the identified template. For example, such code may include the identifier of the template. Thus, the SMS message may be generated such that a data portion of the SMS message only includes the identifier of the template and a template flag indicating that the SMS message includes a code associated with a template to be translated by a receiver of the SMS message.

The first device 402 may then send the generated SMS message to the second mobile device 406 via the SMSC 412 located in the SMS network 410. As an option, the SMSC 412 may process the SMS message (e.g. for billing purposes, et.), and then may forward the SMS message on to the second mobile device 406. Upon receipt of the SMS message by the second mobile device 406, the template engine 408 of the second mobile device 406 translates the SMS message.

For example, the template engine 408 of the second mobile device 406 may convert the code included in the SMS message to the data represented by the code. With respect to the present embodiment, such translation may include the template engine 408 of the second mobile device 406 identifying the template identified by the identifier included in the SMS message. The translation may further include converting the template to data (e.g. text, etc.) for display to a user of the second mobile device 406, such that data desired to be communicated by the user of the first mobile device 402 may be displayed to the user of the second mobile device 406.

In another embodiment, the template engine 404 of the first mobile device 402 may receive a message from the user of the first mobile device 402, where the message includes an identifier of a template and a data control string to be utilized for customizing the template. For example, the user may have selected the template from a plurality of predefined templates (e.g. stored by the template engine 404 of the first mobile device 402), and upon such selection the message may have been automatically generated to include an identifier of the selected template. The user may have further manually entered (e.g. typed) the data control string for inclusion in the message.

Upon receipt of the message, the template engine 404 of the first mobile device 402 may then identify the template associated with the identifier of the template included in the message. For example, the template engine 404 may use such identifier to identify the template. Further, the template engine 404 of the first device 402 generates an SMS message using a code associated with the identified template and the data control string. For example, such code may include the identifier of the template. Thus, the SMS message may be generated such that a data portion of the SMS message only includes the identifier of the template, a template flag indicating that the SMS message includes a code associated with a template to be translated by a receiver of the SMS message, and the data control message by which the template is to be customized.

The first device 402 may then send the generated SMS message to the second mobile device 406 via the SMSC 412 located in the SMS network 410, in the manner noted above. Upon receipt of the SMS message by the second mobile device 406, the template engine 408 of the second mobile device 406 translates the SMS message. For example, the template engine 408 of the second mobile device 406 may convert the code included in the SMS message to the data represented by the code. With respect to the present embodiment, such translation may include the template engine 408 of the second mobile device 406 identifying the template identified by the identifier included in the SMS message, converting the template to data (e.g. text, etc.) and customizing the data using the data control string, for display of the customized data to a user of the second mobile device 406.

In yet another embodiment, the template engine 404 of the first mobile device 402 may receive a message from the user of the first mobile device 402, where the message includes text. Upon receipt of the message, the template engine 404 of the first mobile device 402 may identify a template associated with the message. If the message does not indicate a particular template, as in the embodiments described above, a default template is identified. In the present embodiment, the default template may include a dictionary of words and/or phrases in which a different index is associated with each of such words and/or phrases.

Furthermore, the template engine 404 of the first device 402 generates an SMS message using a code associated with the identified template. For example, it may be determined whether each word and/or phrase included in the message matches a word and/or phrase in the identified template. If a match is found, the index corresponding to a word and/or phrase for which the match was found may be identified. Further, such index may replace the word and/or phrase represented thereby when generating the SMS message, such that the SMS message may include indices in place of the words and/or phrases that such indices represent. The SMS message may further be generated to include an identifier of the template associated with the codes and a template flag.

The first device 402 may then send the generated SMS message to the second mobile device 406 via the SMSC 412 located in the SMS network 410, in the manner noted above. Upon receipt of the SMS message by the second mobile device 406, the template engine 408 of the second mobile device 406 translates the SMS message. For example, the template engine 408 of the second mobile device 406 may convert the code included in the SMS message to the words and/or phrases represented by the code. With respect to the present embodiment, such translation may include the template engine 408 of the second mobile device 406 identifying the template identified by the identifier included in the SMS message and converting the codes included in the SMS message to the words and/or phrases represented by such codes, for display of the customized data to a user of the second mobile device 406.

As also shown, the SMSC 412 also includes a template engine 414. The template engine may be utilized in the same manner described above with respect to the template engine 404 of the first mobile device 402 and the template engine 408 of the second mobile device 406, such that the SMSC 412 may similarly generate SMS messages using template codes and translate SMS messages generated using template codes. For example, the SMSC 412 may transmit mobile broadcast messages to the first mobile device 402 and the second mobile device 406 (e.g. such as latest updates to be provided to subscribers of the SMS network 410 in a timely manner). As another option, the template engine 414 of the SMSC 412 may be used to interpret an SMS message generated using template codes and forward the SMS message as text (e.g. via another SMS message), when a device to which the SMS message generated using template codes is destined does not include a template engine for performing the interpretation.

As also shown, a template generator 416 is in communication with the SMSC 412. The template generator 416 may be implemented by a service provider, and may optionally provide templates to the SMSC 412. Such templates may each include predefined data representative of a common broadcast message, for example. As an option, the templates may be broadcasted from the SMSC 412 to the first mobile device 402 and the second mobile device 406 during non-peak hours, and may be interpreted and stored by the template engines 404, 406 of the first mobile device 402 and the second mobile device 406 for use thereof in generating SMS messages.

Figure 5:
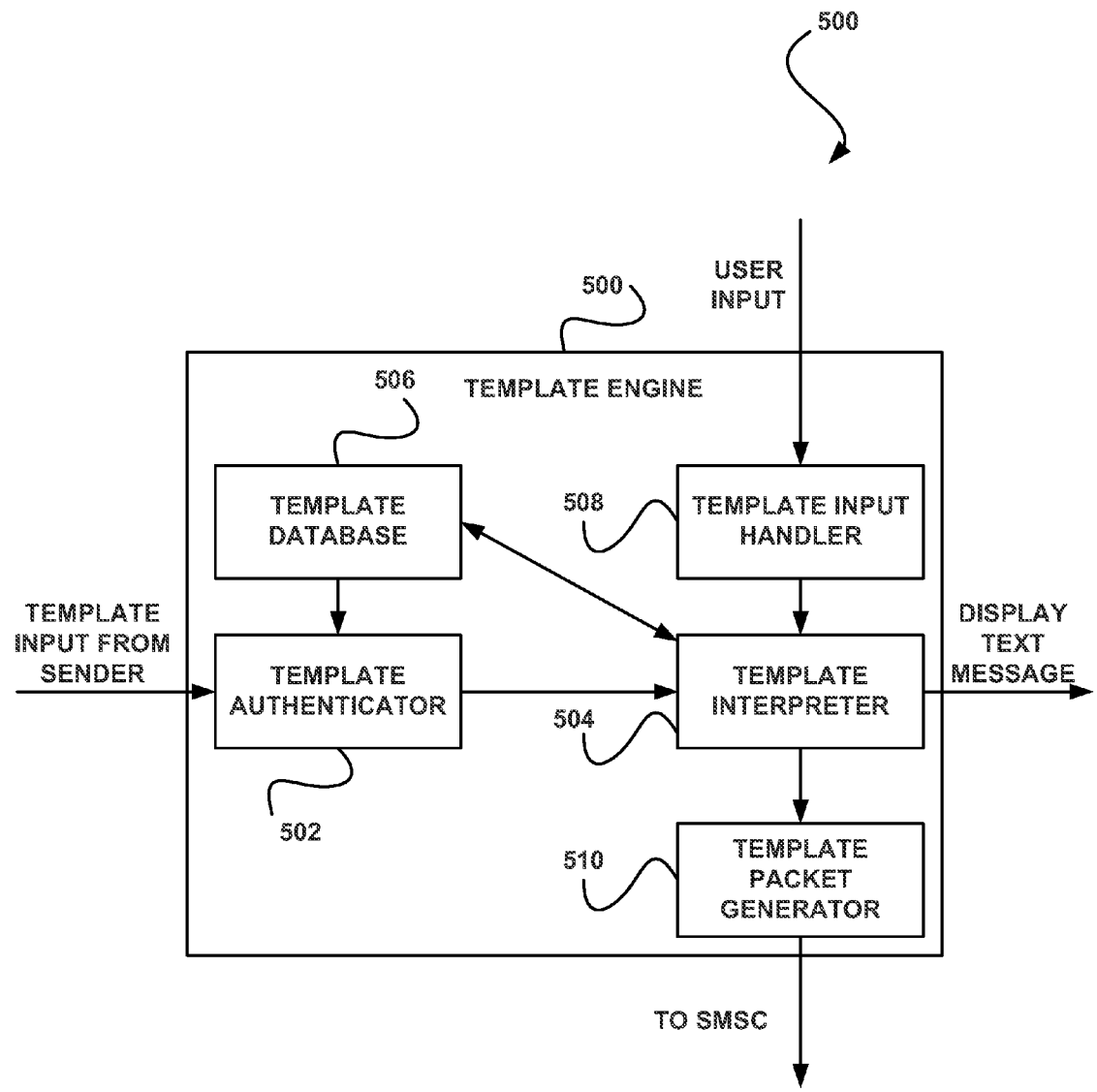
FIG. 5 illustrates a template engine utilized for storing, interpreting, and handling SMS templates, in accordance with yet another embodiment.

FIG. 5 illustrates a template engine 500 utilized for storing, interpreting, and handling SMS templates, in accordance with yet another embodiment. As an option, the template engine 500 may be implemented in the context of the details of FIGS. 1-4. For example, the template engines 404, 408, and 414 of FIG. 4 may each include the template engine 500 shown in the present embodiment. Of course, however, the template engine 500 may be implemented in any desired environment. Yet again, the aforementioned definitions may equally apply to the description below.

As shown, the template engine 500 includes various components (e.g. software modules, etc.), as described below. For example, the template engine 500 includes a template authenticator 502 which receives templates from an SMSC (e.g. via a broadcast) or other sender. Upon receipt of a template by the template authenticator 502, the template authenticator 502 authenticates the received template. For example, the template authenticator 502 may authenticate the received template by ensuring that the received template is in a proper format for use by the template engine 500.

The template authenticator 502 then forwards the received template to a template interpreter 504. The template interpreter 504 stores the template to a template database 506, in response to a determination by the template interpreter 504 that the template does not already exist in the template database 506 (e.g. as determined by querying the template database 506). The template interpreter 504 may store the template in the template database 506 in association with a template identifier for the template (e.g. as generated by the template interpreter 504 or the template database 506). In another embodiment where the received template is an identifier of a template included in an SMS message received from the sender, the template interpreter 504 identifies the template identified in the SMS message from the template database 506 and converts the template to text for display (e.g. as a text message) to a user of the device on which the template engine 500 is implemented.

Further, a message input by the user of the device on which the template engine 500 is implemented that includes an identifier of a template and a data control string for customizing the template is received by a template input handler 508. The template input handler 508 forwards the message to the template interpreter 504 for generating an SMS message to be sent by the device on which the template engine 500 is implemented. For example, the template interpreter 504 generates the SMS message by setting a template flag in the SMS message, inserting the identifier of the template into the SMS message, and inserting the control data strings into the SMS message. The generated SMS message is then sent to a template packet generator 510, which converts the SMS message into a data packet and transmits the SMS message as the data packet to the SMSC (e.g. via a transmission unit of the device on which the template engine 500 is implemented).

Figure 6:
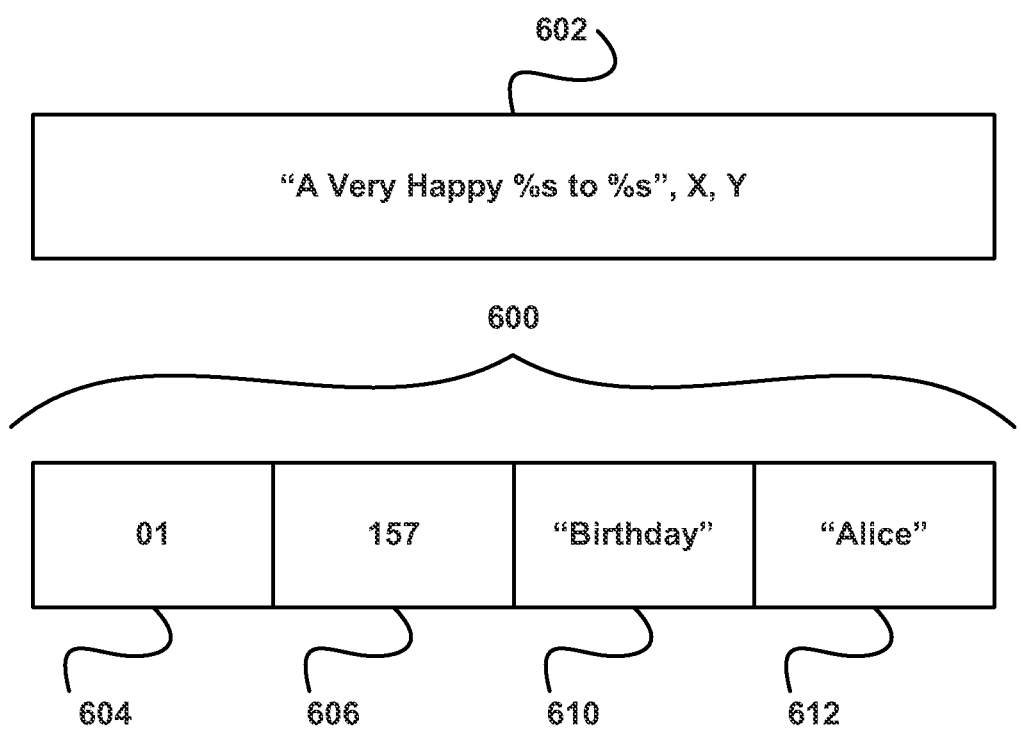
FIG. 6 illustrates an SMS message generated using a template code, in accordance with still yet another embodiment.

FIG. 6 illustrates an SMS message 600 generated using a template code, in accordance with still yet another embodiment. As an option, the SMS message 600 may be implemented in the context of the details of FIGS. 1-5. Of course, however, the SMS message 600 may be implemented in any desired environment. Further, the aforementioned definitions may equally apply to the description below.

As shown, a template 602 includes text capable of being customized. For example, the message may be customized by a user designating the values of 'X' and 'Y'. It should be noted that while the text "A Very Happy % s to % s" is shown, other templates may be available for use in generating an SMS message, for example, where such templates include "Good % s % s" (e.g. "Good Morning Mike", "Good Night Bell"), or where such templates includes a specific scheme or pattern (e.g. for messages associated with specific events, such voting associated with television programs, etc.

To generate an SMS message 600 using a code associated with the template 602, the SMS message 600 may be generated to include a template flag 604 indicating that the SMS message includes the code associated with the template 602. The template flag 604 may optionally be two bits, with 01 indicating that the SMS message includes a code associated with the template 602, and 00 indicating that the SMS message does not include a code associated with the template 602.

The SMS message 600 may also be generated to include an identifier 606 of the template 602. The SMS message 600 may further be generated to include the data control strings 610, 612 to be used to customize the message included in the template 602. For example, the first data control string 610 may replace the first customizable value of the template 602 (i.e. 'X' in the present embodiment), and the second data control string 612 may replace the second customizable value of the template 602 (i.e. 'Y' in the present embodiment).

In the embodiment shown, in an otherwise 160 character SMS message, a character may occupy 7 bits. Further, if 256 ($2^8$) templates are stored in a template database of a template engine, the template identifier may require only one byte of memory in the SMS message 600. Thus, a size of the SMS message 600 may be reduced. For example, when applied to the embodiment described above, 210 bits which would have otherwise been used to send the message via SMS without the template code (e.g. by including an entire text of the message represented by the template 602), may only require 101 bits to send the SMS message 600 by using the template code.

As another example, where a template includes a dictionary of words/phrases and their associated indices, at least a portion of words/phrases in a message may be replaced with the indices to generate an SMS message that uses the indices in place of the words/phrases, such that a packet size associated with the SMS message may be reduced.

For example, each word in a dictionary of 65536 ($2^{16}$) words may require at most 2 bytes of space (for index) in the SMS message. Thus, replacing the words with indices may save space in the SMS message. In order to allow use the template of words/phrases for sending SMS message, devices receiving and sending such SMS messages may utilize the template as a standard template for replacing words/phrases.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a tangible computer readable medium, comprising:
   computer code for receiving a message to be sent as a short message service (SMS) message, the message received in the form of an identifier of a template and a control string for customizing the template;
   computer code for identifying the template utilizing the identifier of the template;
   computer code for identifying at least one code associated with the template; and
   computer code for generating the SMS message using the at least one code and the control string, such that the SMS message includes at least the control string;
   wherein the at least one code includes the identifier of the template, and the SMS message is generated to include the identifier of the template, such that content of the template other than the identifier of the template is prevented from being included in the SMS message.

2. The computer program of claim 1, wherein the computer program is operable such that the message is received utilizing a graphical user interface (GUI) of a mobile device.

3. The computer program of claim 1, wherein the computer program is operable such that the template is selected from a plurality of predefined templates by a user via a GUI of a mobile device, and the control string is entered by the user via the GUI of the mobile device.

4. The computer program of claim 3, wherein the computer program is operable such that the predefined templates are stored on the mobile device.

5. The computer program of claim 1, wherein the computer program is operable such that the message is received in the form of text.

6. The computer program of claim 1, wherein the computer program is operable such that the at least one code associated with the template is included in the template and is an index associated with a word included in the message.

7. The computer program of claim 6, wherein the word included in the message is matched to the at least one code included in the template, and the index associated with the matched word is identified.

8. The computer program of claim 1, wherein the computer program is operable such that the at least one code associated with the template is included in the template and is an index associated with a phrase included in the message.

9. The computer program of claim 1, wherein generating the SMS message using the at least one code includes inserting the at least one code into the SMS message.

10. The computer program of claim 1, wherein generating the SMS message using the at least one code includes replacing at least a portion of the message with the at least one code.

11. The computer program of claim 1, wherein the computer program is operable such that the SMS message is further generated by setting a template flag in the SMS message.

12. The computer program of claim 11, wherein the template flag in the SMS message indicates that the SMS message includes the at least one code associated with the template, and the template flag is utilized by a receiver of the SMS message to identify the at least one code and convert the at least one code to data.

13. The computer program of claim 11, wherein the SMS message includes each of the at least one code, the control string, and the template flag.

14. The computer program of claim 1, wherein the SMS message is generated using the at least one code for reducing a size of the SMS message utilized for sending the received message.

15. A method, comprising:
   receiving a message to be sent as a short message service (SMS) message, the message received in the form of an identifier of a template and a control string for customizing the template;
   identifying the template utilizing the identifier of the template;
   identifying at least one code associated with the template; and
   generating, utilizing a processor, the SMS message using the at least one code and the control string, such that the SMS message includes at least the control string;
   wherein the at least one code includes the identifier of the template, and the SMS message is generated to include the identifier of the template, such that content of the template other than the identifier of the template is prevented from being included in the SMS message.

16. A system, comprising:
a processor for:
- receiving a message to be sent as a short message service (SMS) message, the message received in the form of an identifier of a template and a control string for customizing the template;
- identifying the template utilizing the identifier of the template;
- identifying at least one code associated with the template; and
- generating the SMS message using the at least one code and the control string, such that the SMS message includes at least the control string;
- wherein the at least one code includes the identifier of the template, and the SMS message is generated to include the identifier of the template, such that content of the template other than the identifier of the template is prevented from being included in the SMS message.

17. The system of claim 16, wherein the processor is coupled to memory via a bus.

18. A computer program embodied on a tangible computer readable medium, comprising:
- computer code for receiving a message to be sent as a short message service (SMS) message, the message received in the form of an identifier of a template and a control string for customizing the template;
- computer code for identifying the template utilizing the identifier of the template;
- computer code for identifying at least one code associated with the template; and
- computer code for generating the SMS message using the at least one code and the control string, such that the SMS message includes at least the control string;
- wherein the computer program is operable such that the at least one code associated with the template is included in the template and is an index associated with a word included in the message;
- wherein the word included in the message is matched to the at least one code included in the template, and the index associated with the matched word is identified.

19. A computer program embodied on a tangible computer readable medium, comprising:
- computer code for receiving a message to be sent as a short message service (SMS) message, the message received in the form of an identifier of a template and a control string for customizing the template;
- computer code for identifying the template utilizing the identifier of the template;
- computer code for identifying at least one code associated with the template; and
- computer code for generating the SMS message using the at least one code and the control string, such that the SMS message includes at least the control string;
- wherein the computer program is operable such that the SMS message is further generated by setting a template flag in the SMS message;
- wherein the template flag in the SMS message indicates that the SMS message includes the at least one code associated with the template, and the template flag is utilized by a receiver of the SMS message to identify the at least one code and convert the at least one code to data.

20. A computer program embodied on a tangible computer readable medium, comprising:
- computer code for receiving a message to be sent as a short message service (SMS) message, the message received in the form of an identifier of a template and a control string for customizing the template;
- computer code for identifying the template utilizing the identifier of the template;
- computer code for identifying at least one code associated with the template; and
- computer code for generating the SMS message using the at least one code and the control string, such that the SMS message includes at least the control string;
- wherein the computer program is operable such that the SMS message is further generated by setting a template flag in the SMS message;
- wherein the SMS message includes each of the at least one code, the control string, and the template flag.

* * * * *